Oct. 5, 1965  J. L. McQUERRY  3,209,816
FUEL HEATER AND SEPARATOR
Filed April 26, 1963

INVENTOR.
JOHN L. McQUEERY
BY *Roy L. Van Winkle*
ATTORNEY

United States Patent Office 3,209,816
Patented Oct. 5, 1965

3,209,816
FUEL HEATER AND SEPARATOR
John L. McQuerry, Bethany, Okla., assignor of forty-five percent to Wiley W. Lowrey, Oklahoma City, Okla.
Filed Apr. 26, 1963, Ser. No. 276,003
4 Claims. (Cl. 165—71)

This invention relates generally to an improved heater and separator for use in liquid fuel systems. More particularly, it is related to improved apparatus for heating diesel fuel and separating foreign substances, primarily water, therefrom while installed in the fuel system of diesel engines.

The efficient operation of diesel engines during extremely cold weather has been severely hampered because of the tendency of the fuel to become more viscous and because of the presence of water in the fuel, freezing of the water results in blocked fuel lines and plugged filters. As a result of the increased viscosity of the fuel, more power is required to drive the fuel pump and higher injection pressures are required. If the gelation becomes extreme, the engine may stop functioning altogether or at least miss badly.

The presence of water in the fuel not only presents problems during cold weather; it may cause the fuel injectors to be damaged to the extent that they must be replaced. The frequency of replacement depends upon the moisture content of the fuel. Many factors contribute moisture to the fuel, for example, condensation within the fuel tanks in areas of high humidity and if the main supply tanks of fuel dealers are not carefully drained, water may be pumped from them directly into the engine tanks. If sufficient water reaches the engine, it will not function.

Many attempts have been made to solve or at least minimize the foregoing problems. Naturally, much has been done toward improving the fuel and the method of handling it to reduce its gelling temperature and to eliminate insofar as possible the presence of water therein. Chemical fuel additives manufactured by many companies are available. These chemicals are added to the fuel to alleviate the gelation of the fuel during cold weather. Also, many types of apparatus for use as fuel heaters have been constructed with various degrees of success. One such heater involved the immersion of electrical heating elements in the fuel tanks. Another heater passed the exhaust manifold directly through the fuel tanks. Neither of these was particularly successful. In the Arctic, heavy insulation has been wrapped around the tanks and engines so that the engine heat was utilized to some extent. The insulation prevented the cold air from directly contacting the tanks and aided in retaining the engine heat.

Almost without exception, fuel systems are now equipped with filters. The filters are designed to remove water and other foreign matter from the fuel. During cold weather, the water thus removed, freezes in the filter. This eventually results in a complete stoppage of the fuel flow to the engine. Even in warm weather, the filter will have to be changed frequently where the moisture content of the fuel is high.

One object of this invention is to provide improved apparatus adapted to be installed in the fuel system and to provide sufficient heat to the fuel passing therethrough to prevent gelation and assure maximum engine efficiency even in extremely cold weather.

Another object of this invention is to provide improved apparatus adapted to be installed in the fuel system and to separate moisture and other foreign materials from the fuel passing therethrough.

A further object of this invention is to provide improved apparatus adapted to be installed in the fuel system that will provide sufficient heat to the fuel to prevent gelation and to separate moisture and other foreign materials from the fuel passing therethrough.

A still further object of the invention is to provide improved apparatus adapted to be installed in the fuel system that utilizes a portion of the heat from the engine exhaust gases to increase the temperature of the fuel passing therethrough.

Still another object of this invention is to provide improved apparatus adapted to be installed in the fuel system that utilizes a portion of the heat from the engine exhaust gases to increase the temperature of the fuel and utilizes a series of baffles arranged therein to separate water and other foreign material from the fuel passing therethrough.

Generally, this invention includes a hollow tube-like member connected with an exhaust deflector or scoop mounted in the exhaust pipe or manifold of the engine, a second hollow member surrounding the tube-like member and joined at each end with the tube-like member thus forming an annulus therebetween, a pair of fuel inlets and a fuel outlet mounted on the top of said second hollow member, a drain valve mounted on the bottom of said second hollow member, means connecting said inlets with a fuel supply, and means connecting said outlet with the engine.

Other, further, and additional objects and advantages of the invention will become more apparent as the following description is read in conjunction with the accompanying drawing wherein like reference characters denote like parts in all views and wherein.

Figure 1:
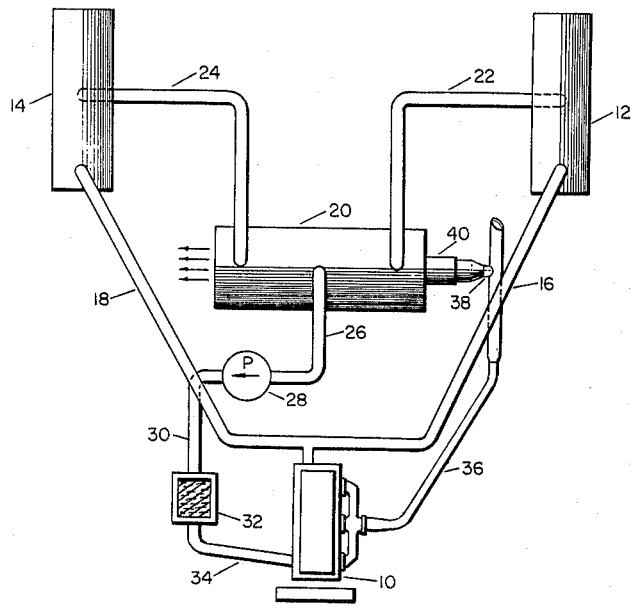
FIGURE 1 is a schematic view of a diesel engine's fuel and exhaust system incorporating apparatus constructed in accordance with the invention.

Referring to the drawing, and to FIGURE 1 in particular, shown therein is an engine 10 connected by return fuel lines 16 and 18 to the fuel tanks 12 and 14. The heater and separator 20 is connected with the fuel tanks 12 and 14 by the fuel supply lines 22 and 24. Also connected with the heater and separator 20 is the fuel outlet pipe 26 which is connected at its opposite end with the fuel pump 28. Pipe 30 connects the pump 28 with the fuel filter 32 and pipe 34 connects the filter 32 with the engine 10. The exhaust manifold or pipe 36 is connected at one end with the engine and is open to the atmosphere at the other.

Figure 5:
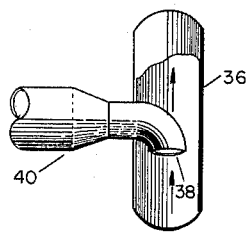
FIGURE 5 is an enlarged view of the exhaust diverter or scoop mounted in the exhaust pipe or manifold of the engine.

A scoop or exhaust diverter 38 is mounted so that it extends into the exhaust pipe 36. As can be more clearly seen in FIGURE 5, the scoop 38 is arranged so that only a portion of the exhaust is diverted from the pipe 36. Connected with the scoop 38 is a pipe 40 which carries the exhaust to the heater and separator 20. It should be pointed out that the pipe 40 will be of a size and length required to reach from the pipe 36 to the separator and heater 20 even though they may be somewhat remote from each other. Also, it may be flexible or include a section of flexible exhaust hose if desired or required.

Figure 4:
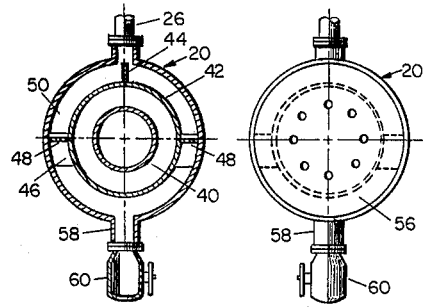
FIGURE 4 is a sectional view of the heater of FIGURE 2 taken along the line 4—4 of FIGURE 2.
Figure 3:
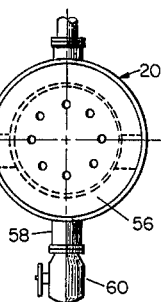
FIGURE 3 is an end view of FIGURE 2 taken along the line 3—3 of FIGURE 2.
Figure 2:
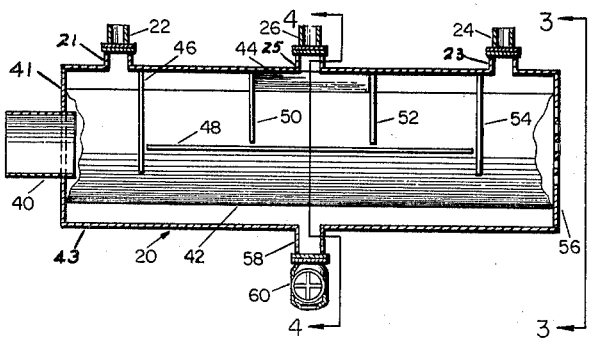
FIGURE 2 is an enlarged view, partly in cross-section of the fuel heater and separator constructed in accordance with the invention.

FIGURES 2, 3, and 4 illustrate the construction of the heat exchanger and separator 20 in detail. It includes an end plate 41 through which the pipe 40 extends. Practically, the pipe 40 will be joined with a short nipple or threaded collar (not shown) which is welded to the end plate 41. An outer hollow member or shell 43 is joined at one end to the plate 41 and at the other end with the ported plate 56. Within the shell 43 is an inner hollow member 42. One end of the member 42 is joined to the plate 41 and the other to the ported plate 56. As shown, both the members 42 and 43 are cylindrical, but such a shape is not essential to the operation of the invention.

The arrangement of the member 42 with respect to the member 43 is such that a fluid-tight annular chamber is formed therebetween. The ends of the chamber are closed by the plates 41 and 56. As illustrated in FIGURE 2, the interior of the hollow member 42 is in communication with the exhaust manifold 36 through the pipe 40. The ports are placed in the member 56 so that exhaust gases entering the interior of the hollow member 42 can escape therethrough to the atmosphere.

Fuel inlets 21 and 23 are located on the upper portion of the exchanger 20 and near either end thereof. Fuel outlet 25 is centrally located on the upper portion of the exchanger 20. The fuel inlets 21 and 23 and the fuel outlet 25 are in fluid communication with the annular chamber formed between the members 42 and 43. Fuel supply lines 22 and 24 connect with fuel inlets 21 and 23, respectively. Fuel outlet 25 is connected to the fuel outlet pipe 26.

A drain connection 58 is centrally located on the bottom portion of the exchanger 20 and is in communication with the annular chamber. Connected with the drain connection 58 is a valve 60.

A series of baffles extend between the members 42 and 43. A vertical baffle 44 is positioned vertically and extends longitudinally just below the fuel outlet 25. Circumferential baffles 46 and 54 are positioned between the fuel inlets 21 and 23, respectively. They extend partially around the circumference of the member 42, terminating just below the lower side of horizontal baffle plates 48. Two baffle plates 48 are provided with one being located on either side of the member 42 and extending longitudinally therewith. It is important to note that the baffles 48 terminate before reaching the baffles 46 and 54 so that a small gap or opening is left between the baffles.

Short circumferential baffle plates 50 and 52 are located adjacent the ends of the vertical baffle 44. They extend around the circumference of the member 42 and terminate before reaching the horizontal baffle plates 48, thus leaving a small gap therebetween.

With the engine 10 in operation, exhaust gases pass through the manifold or pipe 36 to the atmosphere. A portion of the exhaust gas is diverted by the scoop 38 mounted in the pipe 36. The gas thus diverted passes through the suitable connecting pipe 40 into the interior of the hollow member 42. Due to the restriction offered by the ported plate 56, the velocity of the gas passing through the exchanger 20 is substantially reduced, thus allowing more time for heat transfer from the hot gas to the exchanger 20 to take place.

Simultaneously, fuel is being circulated from the tanks 12 and 14, through the supply lines 22 and 24 into the exchanger and separator 20. The fuel leaves the exchanger 20 through the outlet pipe 26, passes through the fuel pump 28, and the pipe 30 to the filter 32. In the filter 32, a final attempt is made to separate moisture and other foreign matter from the fuel before it enters the engine 10. After passing through the filter 32, the fuel flows through pipe 34 to the engine 10.

Diesel systems are equipped with a series of injectors (not shown) through which the fuel must pass to enter the cylinders of the engine. The passages in the injectors are rather small and foreign matter such as water can cause serious erosion therein or otherwise foul them so that they must be replaced. Excess fuel passing by the injectors returns to the fuel tanks 12 and 14 through return fuel lines 16 and 18, respectively.

As the fuel enters the exchanger 20, it passes downwardly therein, then upwardly through the gap between circumferential baffles 46, 54 and the ends of the horizontal baffles 48. The fuel must then pass through the gap between the short circumferential baffles 50, 52 and the top of the horizontal baffles 48. From this point the fuel flows upwardly along both sides of the vertical baffle 44 into the fuel outlet 22 and thence into the outlet pipe 26.

Periodically, the water accumulation in the lower portion of the exchanger 20 is drained by opening the valve 60 which is in communication with the drain connection 58.

It is believed that the theory of the heat transfer in the exchanger 20 is readily apparent, thus requiring no further explanation. It is believed that separation of moisture and other foreign objects from the fuel occurs due to several factors. The fuel passing through the exchanger and separator 20 is subjected to very extreme directional changes, it is passed through rather small openings, and a quiet area below baffles 48 is created in which some settling can take place. These effects can be more readily appreciated realizing that as much as 90 to 100 pounds of fuel per hour will be passing through the exchanger 20.

It should be apparent that this invention discloses simple and economical apparatus that will efficiently heat the fuel and separate water and other foreign substances therefrom. It has been proven that when installed on a diesel engine-powered truck, the apparatus of this invention will enable such vehicle to operate at temperatures of minus 40 to 50 degrees Fahrenheit. It also extends the life of injectors, fuel pumps, and fuel filters.

The foregoing description is by way of illustration only and it should be apparent that many modifications and changes may be made therein without departing from the spirit of the invention or from the scope of the annexed claims.

What I claim is:

1. A heat exchanger and separator for use in a fluid system to remove materials of higher specific gravity from the fluid passing through the heat exchanger and separator and for heating the fluid flowing therethrough, said heat exchanger and separator comprising:
   (1) a first tubular member,
   (2) a second tubular member of larger diameter and surrounding said first tubular member and having the ends thereof closed, the arrangement being such that a chamber is formed between said members,
   (3) means forming a plurality of passageways through one end of said second tubular member within the circumference of said first tubular member,
   (4) means forming a passageway through the other end of said second tubular member within the circumference of said first tubular member,
   (5) means forming an opening in the medial portion wall of said second tubular member,
   (6) valve means located in said opening, said valve means being movable between open and closed positions to permit the removal of the higher specific gravity material from said chamber when in the open position and, when in the closed position, to prevent flow through said opening,
   (7) baffle means extending between said first and second tubular members including,
      (a) a pair of longitudinal baffle members extending along said tubular members on opposite sides thereof,
      (b) a first pair of circumferential baffle members terminating below and spaced apart from the ends of said pair of longitudinal baffle members,
      (c) a second pair of circumferential baffle members positioned between said first pair of circumferential baffle members and having the ends thereof spaced apart from said longitudinal baffle members, and (d) a second longitudinal baffle member extending along said tubular members and between said second pair of circumferential baffle members and disposed approximately 90° from said pair of longitudinal baffle members, (8) a pair of inlet means in communication with the chamber between said tubular members, each of said inlet means being located between the ends of said second tubular member and said first pair of circumferential baffle members, said inlet means being arranged to permit the entrance of fluid into said chamber, and (9) outlet means in communication with the chamber between said tubular members, said outlet means being located over said second longitudinal baffle member and between said second pair of circumferential baffle members.

2. A heat exchanger and separator for use in a fluid system to remove materials of higher specific gravity from the fluid flowing through the heat exchanger and separator and for heating the fluid flowing therethrough, said heat exchanger and separator comprising:

an inner hollow member;

an outer hollow member coaxially arranged with respect to said inner hollow member;

an end plate attached to both of said members and having an opening therethrough in communication with the interior of said inner hollow member;

a ported end plate attached to both of said members and having a plurality of ports therethrough in communication with the interior of said inner hollow member, the arrangement of said end plates and hollow members being such that a chamber is formed thereby;

a pair of inlet means in communication with said chamber, each inlet being disposed relatively near one of said end plates and arranged to permit the entrance of fluid into said chamber;

outlet means in communication with said chamber disposed between said inlet means and substantially aligned therewith;

a first pair of spaced-apart baffle members extending between a portion of said inner and outer hollow members between said inlet means and on either side of said outlet means;

a pair of longitudinal baffle members extending between said inner and outer hollow members on opposed sides of said hollow members and having each of the ends of said longitudinal baffle members spaced apart from said spaced-apart baffle members;

means forming an opening extending through the wall of said outer hollow member disposed on the opposite side thereof with respect to said outlet and inlet means; and, valve means operably disposed in said opening, said valve means being movable between open and closed positions to permit the removal of the higher specific gravity material from said chamber, when in the open position and, when in the closed position, to prevent flow through said opening.

3. The heat exchanger and separator of claim 2 and also including:

a second pair of spaced-apart baffle members extending between said hollow members, said second pair of spaced-apart baffle members being disposed between said first pair of spaced-apart baffle members and on either side of said outlet means and having the ends thereof spaced apart from said pair of longitudinal baffle members; and, a second longitudinal baffle member extending between said inner and outer hollow members and said second pair of spaced-apart baffle members and disposed approximately 90° from said first pair of longitudinal baffle members and on the opposite side of said hollow members relative to said opening.

4. A heat exchanger and separator for use in a fluid system to remove materials of higher specific gravity from the fluid passing through the heat exchanger and separator and for heating the fluid flowing therethrough, said heat exchanger and separator comprising:

an inner hollow member through which a heating medium may flow, an outer hollow member coaxially arranged with respect to said inner hollow member, an end plate attached to both of said members and having an opening extending therethrough, said opening being in communication with the interior of said inner hollow member only;

an end plate attached to both of said members and having a plurality of ports extending therethrough, said ports being in communication with the interior of said inner hollow member only;

said inner and outer hollow members and said end plates being arranged to form a chamber defined by said inner and outer hollow members and said end plates;

means forming an opening extending through the medial portion of said outer hollow member into said chamber;

valve means located in said opening, said valve means being movable between open and closed positions, and, when in the open position, arranged to permit the withdrawal of the higher specific gravity material from said chamber, and, when in the closed position, to prevent flow through said opening;

baffle means extending between said inner and outer hollow members, said baffle means including:

a pair of longitudinal baffle members extending along and on opposite sides of said hollow members, a first pair of circumferential baffle members terminating below and spaced apart from the ends of said longitudinal baffle members, a second pair of circumferential baffle members positioned between said first pair of circumferential baffle members, the ends of said second pair of circumferential members being spaced apart from said longitudinal baffle members, and a second longitudinal baffle member extending between said second pair of circumferential baffle members, said second longitudinal baffle member being disposed approximately ninety (90°) degrees from said pair of longitudinal baffle members and on the opposite side of said outer hollow member relative to said opening; and, inlet means in communication with the chamber to permit the flow of fluid into said chamber; and, outlet means in communication with said chamber, the arrangement of said inlet and outlet means being such that fluid entering through said inlet means must pass through said baffle means before reaching said outlet means.

References Cited by the Examiner

UNITED STATES PATENTS

| | | | |
|---|---|---|---|
| 14,386 | 3/56 | Blair | 165—161 |
| 2,070,189 | 2/37 | Webster | 165—154 |
| 2,408,605 | 10/46 | Brookes | 123—122 |
| 2,680,600 | 6/54 | Rothemun | 165—161 |
| 2,747,555 | 5/56 | Brunner | 123—34 |
| 2,917,285 | 12/59 | Schack | 165—139 |

RICHARD B. WILKINSON, *Primary Examiner.*